Feb. 8, 1966 C. E. WINTER 3,233,473

SIGNAL ACTUATED CONTROL DEVICE

Filed Nov. 26, 1962

INVENTOR.
CARL E. WINTER
BY Elliott & Pastoriza
ATTORNEYS

United States Patent Office 3,233,473
Patented Feb. 8, 1966

3,233,473
SIGNAL ACTUATED CONTROL DEVICE
Carl E. Winter, 10514 Kinnard Ave.,
Los Angeles 24, Calif.
Filed Nov. 26, 1962, Ser. No. 240,081
7 Claims. (Cl. 74—57)

This invention generally relates to control devices and more particularly concerns a signal actuated control device designed for use in various semi-automatic and automatic systems, for example, as embodied in missiles, space vehicles, electrical control centers, aircraft, computer apparatus, and other applications characterizing modern technology.

Thus, although the invention will be described from the standpoint of its application to the requirements of a two-position control surface actuator for a sub-system of a missile, it will be appreciated that the invention also has many diverse applications wherever two-position control is required in response to any type of a signal.

An important object of the present invention is to provide a control device or actuator which is constructed of a minimum number of parts, and yet which is rugged and positive in its operation.

Still another object of the present invention is to provide a control device which may be economically constructed and produced on a mass production basis without expensive tooling, complicated dies, or the like.

Still another object of the present invention is to provide a control device which may be constructed with very small overall dimensions and without the necessity of complex assembly or maintenance.

Still a further object of the present invention is to provide an actuator or control device which always will fail-safe in the event of either mechanical or electrical power loss.

These and other objects and advantages of the present invention are generally achieved by providing a signal actuated control device which includes a first rotatable member formed of ferrous or paramagnetic material and a second rotatable member axially spaced therefrom. The second rotatable member is magnetized so as to have permanent magnet characteristics.

A fixed shaft is provided axially between the rotatable member upon which is mounted a first locking member coupled thereto in position between the first and second rotatable members. A second locking member is coupled to the first locking member also in the space between the rotatable members.

At least one of the locking members is subject to magnetization in a manner so as to be repelled from the second rotatable member. The one of said locking members subject to said magnetization is formed of magnetic material so as to be otherwise attracted to the second rotatable member when it is in its de-energized or de-magnetized condition.

One of the locking members is constructed so as to be limited to axial movement while the other locking member is constructed so as to be limited to rotative movement with respect to the shaft.

With such a combination, in response to magnetization of said one of said locking members, two locking members are caused to move in a direction away from the rotatable member which is magnetized. On the other hand, in response to de-magnetization or return to the initial condition of said one locking member, the two locking members are caused to move back into their initial position or in engagement with the second rotatable member.

A power source is provided for driving the first and second rotatable members during the interim period when the locking members are moving back and forth. As soon as the locking members engage either the first rotatable member or the second rotatable member, the locking member limited to rotation will rotate in a manner to lock itself to the particular rotatable member and thereby stop movement of the rotatable member despite the power source to which it is connected. Thus, it is essential that the power source either be a power source subject to stalling, such as a spring, or that a coupling be used between the power source and the rotatable members enabling stalling of the rotatable members without otherwise affecting the power source.

A control rod or the like is coupled to one of the locking members such that the movement of the locking members back and forth between the rotatable members will effect movement of the control rod, either axially or rotatably as desired.

In order to effect magnetization of the particular locking member subject to magnetization, coil means are preferably embodied in the device responsive to a signal to create opposing poles of magnetism in the particular locking member and thereby effect movement of the locking members as heretofore mentioned.

A better understanding of the present invention will be had by reference to the drawings, showing merely one illustrative embodiment, and in which.

Figure 1:
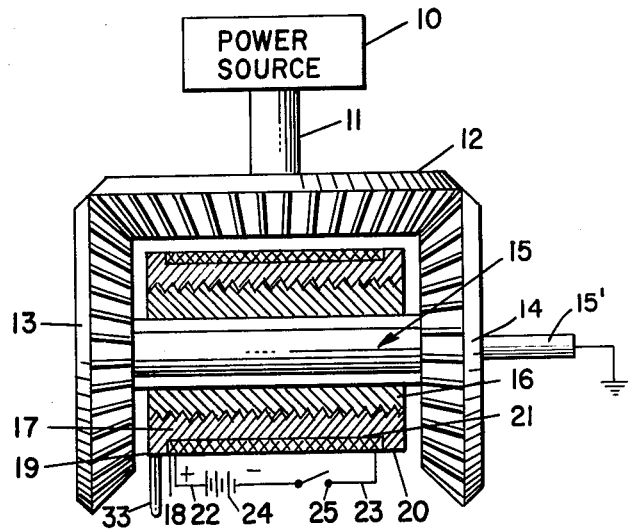
FIGURE 1 is a partial schematic representation of a signal actuated control device according to the present invention illustrating in cross section the parts thereof.

Referring now to the drawings, there is shown in FIGURE 1 a power source denoted by the numeral 10. The power source may be any type of prime mover or motor, although it is preferred that a spring motor be used such that the motor may be stalled without any damage or detrimental effects whatsoever. The power source 10 is connected through an input shaft 11 to an input or driving bevel gear 12.

The driving bevel gear 12 in turn drives a gear 13 preferably formed of ferrous or paramagnetic material and another gear 14 functioning as a permanent magnet. The gear 13 may be formed of any type of paramagnetic or ferro-magnetic material susceptible of magnetic attraction as contrasting the gear 14 actually embodying permanent magnet characteristics.

Disposed between the gears 13 and 14 is a shaft 15 which is journalled in the gears 13 and 14 in a manner such that it does not rotate with the gears 13 and 14. Towards this end, it is preferred that the shaft 15 have an extension 15' and be rigidly fixed or coupled to ground as schematically indicated.

Encircling the shaft 15 is a collar 16 designed for axial movement thereon. An annular nut 17, in turn, encircles the collar 16 and is threadedly connected thereto. These structures will be described in further detail as the specification proceeds.

The nut 17 has mounted about its outer periphery a coil 18 which is designed—upon energization—to magnetize the nut 17. Towards this end, the nut 17 is formed of ferrous material that will lend itself to magnetization. The coil 18 is received between flanges 19 and 20 provided on the nut 17 about a decreased diameter portion 21.

Leads 22 and 23 may connection with the coil 18. The lead 22 may lead to a battery 24, while the lead 23 may lead to a switch 25. This circuit is merely shown by way of illustration as any appropriate circuit may be used for energizing the coil 18 in the manner as required and as hereafter explained.

Figure 2:
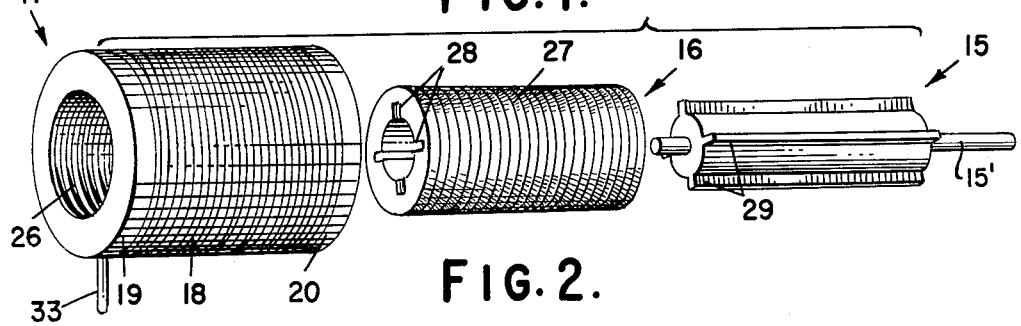
FIGURE 2 is an exploded isometric view of the nut, collar, and shaft embodied in the control device of FIGURE 1.

Referring now to the view of FIGURE 2, it may be seen that the nut 17 is provided with internal threading 26 which is designed to mate with external threading 27 provided on the collar 16. With such a construction, the nut 17 may rotate about the collar 27 but may not move axially except spirally as a result of its rotation. On the other hand, the collar 16 is provided with internal splines 28 designed to mate with external splines 29 provided on the shaft 15. As a consequence, the collar may move axially along the shaft 15 but is not able to rotate with respect thereto.

The operation of the improved control device or actuating structure may now be described in conjunction with the views of FIGURES 3 and 4. In these views, the relative axial position or displacement of the nut 17 with respect to the collar 16 has been exaggerated for purposes of illustration; thus, in actual practice, the nut 17 would only rotate a part of a turn upon engaging either gear 13 or 14.

Figures 3, 4:
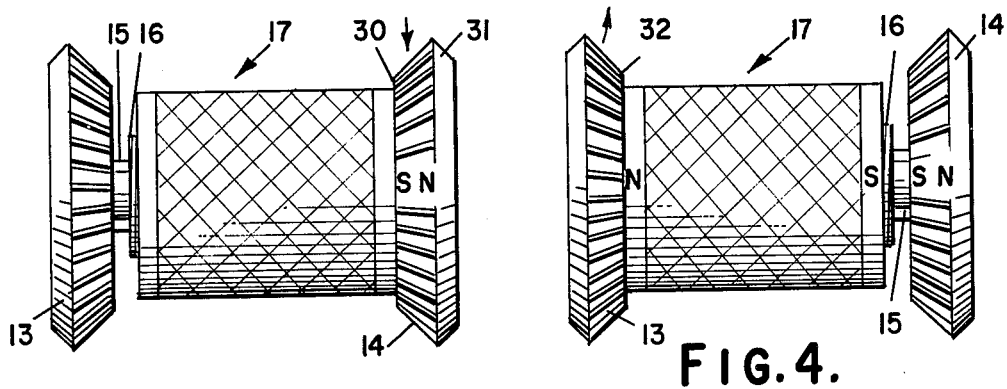
FIGURE 3 is a partial view of the control device of FIGURE 1 in its initial or first position; and, FIGURE 4 is a partial view of the control device of FIGURE 1 in its second or alternate position.

In its initial or first position, the nut 17 and collar 16 would be disposed as shown in FIGURE 3, that is, with the nut 17 tightly engaging the lefthand face of gear 14 or the face 30. The face 30, for illustrative purposes, is denoted the south pole of the permanent magnet characterizing gear 14 and the opposite face 31 is denoted the north pole. Since the nut 17 and collar 16 are preferably formed of ferrous or other paramagnetic material, the south pole of the gear 14 will attract the collar and nut in the demagnetized condition and the nut and collar will be axially urged towards engagement with the gear 14. Assuming the power source 10 is turned on or assuming, for example, that it is a continually coupled spring motor, the gear 14 will be turning until such time as the nut 17 engages same. Thereafter, the gear 14 will turn the nut until the nut 17 threads up tight against the gear 14 at which time the movement of gear 14 will be stopped since the nut is coupled to the collar and the latter cannot rotate because of its splined coupling to the fixed shaft 15. At this time, when the gear 14 stops rotating (assuming a spring motor 10 is used), the motor will stall, and the gears 13, 12, and shaft 11 will also stop turning. The control device will then be in its first or initial position.

Upon energization of the coil 18, for example, by actuating the switch 25 to a closed position as by a radio signal, the nut 17 will be magnetized to have a south pole on its right hand side and a north pole on its left hand side, as viewed in FIGURE 4. In consequence, the south pole on the right hand side of the nut 17 will be repelled from the south pole face 30 of the gear 14 to in turn effect an axial movement of the collar 16 and coupled nut 17 towards the left until the left hand side or north pole side of the collar 16 and thereafter the nut 17 engage the face 32 of gear 13. Again, since the collar and the nut are threadedly coupled, both the collar and the nut will axially move together. When the nut 17 encounters the face 32 of the gear 13, the gear 32 (now rotating) will tend to drive the nut 17 into tighter and tighter threaded engagement with the collar 16 with the result that the nut 17 will prevent further rotation of the gear 13 and in effect stall the power source 10 in the same manner as occurred in the other position with respect to the gear 14. It will be appreciated that not only will the south pole of the nut 17 be repelling the south pole of the gear 14 (in the second or alternate position of FIGURE 4), but also the north pole of the nut 17 will be attracted to the magnetic material of the gear 13.

As soon as de-energization again takes place with respect to the coil 18, for example, by release of the signal and opening of the switch 25, the nut 17 will no longer be magnetized. In such case, the only force acting on the nut will be the attractive force of the south pole of gear 14 which will cause the nut 17 and connected collar 16 to move axially towards the right back to the position as shown in FIGURE 3.

Several important operational features are to be noted in connection with the signal actuated control device of the present invention. As heretofore stated, the collar 16 is only able to move in an axial direction with respect to the shaft 15, while the nut 17 is only able to move in a rotative direction (other than the indirect axial movement as a consequence thereof) with respect to the shaft 15. The collar 16 functions to move the two members axially back and forth while the nut 17 serves to lock up the two members and effect the stalling of the power source. The stalling of the power source is not essential, and as heretofore mentioned, the power source may be continuously operated so long as the gears 13 and 14 may stop. Thus, any type drive enabling the power source to continue operating while the connected gears 13 and 14 remain stalled is satisfactory, for example, by belt coupling or fluid coupling. However, a spring motor, of course, lends itself ideally to such a usage. The important feature of the locking up, however, is the final turning of the nut 17 into its locked position and the resultant angular movement.

It will be appreciated that when the nut moves from its position in FIGURE 3 axially to its position in FIGURE 4 as a consequence of the movement of the collar 16, the nut must also rotate from its slight off-center position to the right (with respect to the collar 16) as viewed in FIGURE 3 to its slight off-center position to the left (as shown with respect to the collar 16) as viewed in FIGURE 4. It is this angular rotation that ultimately represents the particular actuation or control effect desired. This angular rotation may be manifested, for example, in movement of a control rod 33 (see FIGURE 2) which in turn may be coupled to a linkage to change the orientation of the control flap on the missile or to change some other mechanism as desired.

It will be appreciated that in order to have the gears 13 and 14 commence rotating as the collar 16 and nut 17 shift between the axial positions of FIGURES 3 and 4, there must be some type of time lag while this shifting occurs. Otherwise, the gears will not recommence rotating sufficiently to create the locking action desired. This time lag may be either represented by a delay in the build up in the current and the resulting magnetization effected by the coil 18 or it may be represented in the axial distance that the nut 17 and collar 16 must move. Furthermore, it will be appreciated that the rod or shaft 15 must take up the impact that will result as the nut 17 locks itself and the collar 16 against the, respective, gears 13 and 14. In other words, there will be a tendency for the shaft 15 to tend to turn in the direction that the particular gear 13 or 14 is turning at the time that the nut 17 locks up.

With the control device of the present construction, it will be appreciated that only a minimum number of parts need be employed while still producing a relatively small overall package of very economical construction. It will be appreciated, however, that certain changes and variations may be made in the illustrative embodiment shown. Thus, it is conceivable that instead of having the collar splined to the shaft, the collar may be threaded to the shaft on its interior diameter and splined on its outer diameter to the nut. With such a construction, the nut or exterior member would axially slide into engagement with the gears 13 and 14 first, and thereafter, the interior member or collar would thread into locked position. The construction illustratively shown, however, is preferred.

It should also be pointed out that from the standpoint of actual construction, it is desirable that the spacing between the nut 17 and the opposing gears 13 and 14 be relatively close such that only slight axial movement need occur and only slight threading occurs to lock the nut 17 and prevent rotation of the gears 13 and 14, respectively. These and other constructional features will be apparent to those skilled in the art.

The various modifications and changes in construction as heretofore set forth, as well as others falling within the scope and spirit of the invention, are deemed to fall within the claims as hereafter set forth.

What is claimed is:

1. A signal actuated control device comprising: a first rotatable member formed of magnetic material; a second rotatable member axially spaced from said first rotatable member, said second rotatable member being magnetized; a fixed shaft axially disposed between said first rotatable and said second rotatable member; a first locking member coupled to said shaft between said rotatable members; a second locking member coupled to said first locking member between said rotatable members; one of said locking members being subject to magnetization in a manner so as to be repelled from said second rotatable member, said one of said locking members being formed of magnetic material so as to be attracted to said second rotatable member upon de-magnetization; one of said locking members being limited to axial movement and the other of said locking members being limited to rotative movement, whereby upon magnetization of said one of said locking members, said locking means are axially urged towards said first rotatable member, and whereby upon de-energization of said one of said locking members, said locking members are urged back towards said second rotatable member; a power source connected to said first rotatable member and said second rotatable member for driving said first rotatable member and said second rotatable member when said locking members are not engaging same, respectively; and a control member coupled for movement with one of said locking members for performing a control function.

2. A signal actuated control device comprising: a first rotatable member formed of magnetic material; a second rotatable member axially spaced from said first rotatable member, said second rotatable member being magnetized; a fixed shaft axially disposed between said first rotatable member and said second rotatable member; a first locking member coupled to said shaft, said locking member being fixed against rotative movement but axially slidable on said shaft between said rotatable members; a second locking member threadingly coupled to said first locking member and disposed between said rotatable members; one of said locking members being subject to magnetization so as to be repelled from said second rotatable member, said one of said locking members being formed of magnetic material so as to be attracted to said second rotatable member when not magnetized, whereby said first locking member axially urges said locking members towards a position of engagement with said second rotatable member because of the attraction of the magnetic material of one of said locking members to the magnetic pole of said second rotatable member, and whereby in response to magnetization of said one of said locking members, said locking members are axially urged away from said second rotatable member into engagement with said first rotatable member because of the repelling magnetic force between said one of said locking members and said second rotatable member; a power source connected to said rotatable members for driving same when said locking members are not in engagement, respectively, therewith; and, a control member coupled to one of said locking members so as to be actuated in response to said axial movement.

3. A signal actuated control device comprising: a first rotatable member formed of magnetic material; a second rotatable member axially spaced from said first rotatable member, said second rotatable member having permanent magnet characteristics; a fixed shaft; a first locking member coupled to said shaft between said rotatable members, said first locking member being rotatively fixed but axially movable between said rotatable members; a second locking member coupled to said first locking member by threading; a coil wound on said second locking member and subject to energization in response to a signal, said coil upon energization functioning to create opposing north and south poles in said second locking member, whereby said second locking member when so energized will be repelled from said second rotatable member, and whereby said second locking member when not energized will be attracted to said second rotatable member such that said first locking member will serve to axially move said locking members back and forth between said rotatable members and according to the energization and de-energization, respectively, of said second locking member; a power source connected to said first rotatable member and said second rotatable member for driving same when said locking members are not in engagement, respectively, therewith; and a control member coupled to at least one of said locking members for performing a control function in response to said movement.

4. A signal actuated control device, according to claim 3, in which said second locking member will thread itself into locking engagement with said first and second rotatable members, respectively, to stall said first and second rotatable members.

5. A signal actuated control device, according to claim 4, in which said power source is a spring motor.

6. A signal actuated control device comprising: a spring motor; a driving gear connected thereto; a first bevel gear connected to said driving gear; a second bevel gear connected to said driving gear and axially spaced from said first bevel gear; a fixed shaft extending axially between said first bevel gear and said second bevel gear; a first axially movable locking member coupled to said shaft and fixed against rotation with respect to said shaft; a second locking member coupled to said first locking member by threading; said first bevel gear being formed of paramagnetic material, and said second bevel gear being formed of a permanent magnet; a coil mounted on said second locking member subject to energization by a signal actuated system, said coil upon energization creating opposing poles in said second locking member tending to be repelled by said second bevel gear, said second locking member tending to be attracted to said second locking gear upon de-energization of said coil, and said first bevel gear being formed of paramagnetic material so as to be attracted to said second locking member upon energization of said coil; a power source connected to said bevel gears for driving same when said locking members are not in engagement, respectively, therewith said power source being stalled upon engagement of said locking members with either of said gears; and a control member coupled for movement with one of said locking members for performing a control function in response to movement of said locking members.

7. A signal actuated control device, according to claim 6, in which said first locking member comprises an annular collar splined to said shaft, and in which said second locking member comprises an annular nut threadedly connected and encircling said collar.

References Cited by the Examiner
UNITED STATES PATENTS

| 708,863 | 9/1902 | Bussinger. |
| 1,333,707 | 3/1920 | Dies. |
| 1,355,152 | 10/1920 | Laird _____ 74—388 X |
| 3,004,442 | 10/1961 | Colley _____ 74—388 |

FOREIGN PATENTS

| 295,047 | 6/1929 | Great Britain. |

BROUGHTON G. DURHAM, *Primary Examiner.*